Patented June 1, 1948

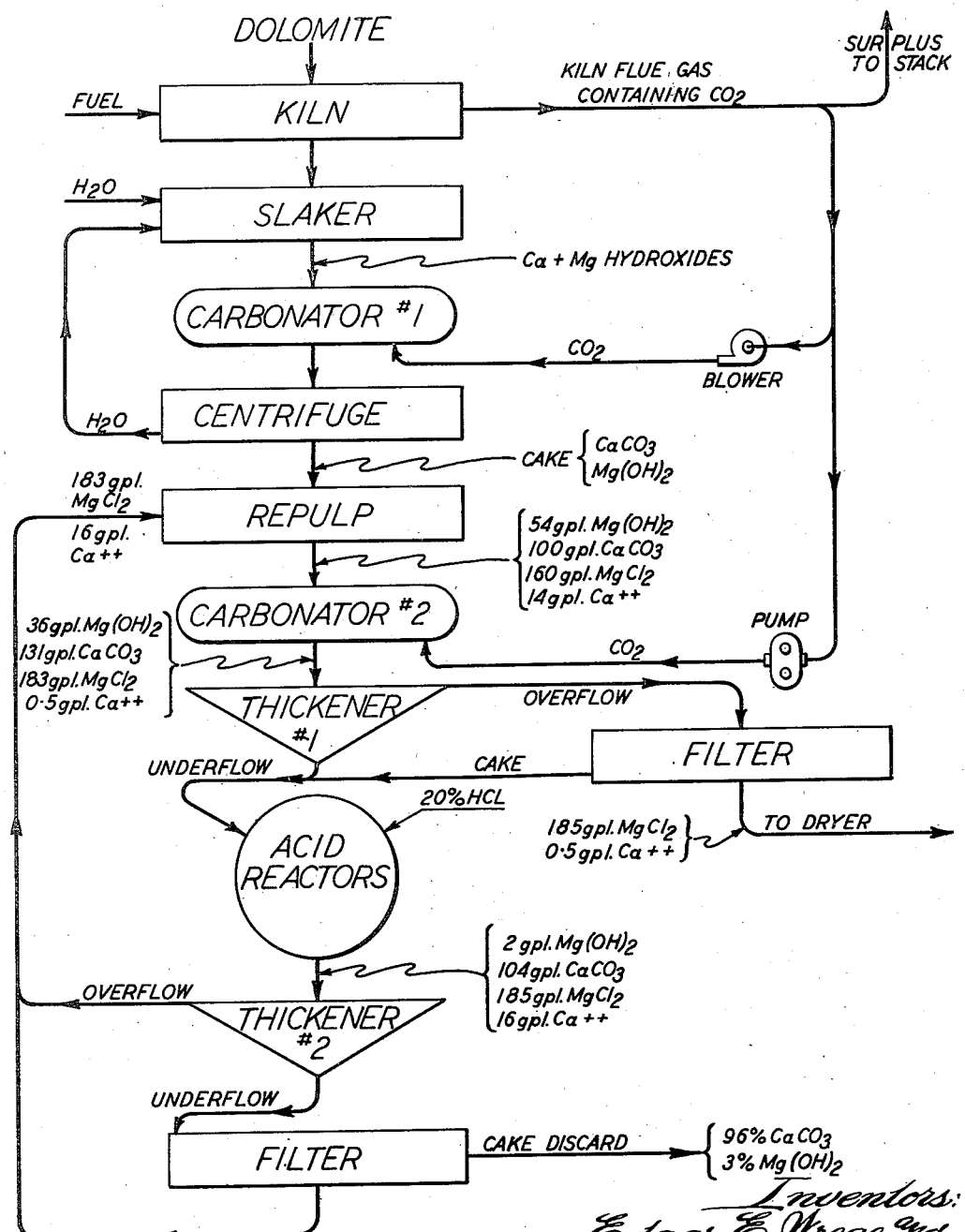

2,442,525

UNITED STATES PATENT OFFICE 2,442,525

MANUFACTURE OF MAGNESIUM CHLORIDE

Edgar E. Wrege, Carlsbad, N. Mex., and William A. Cunningham, Austin, Tex., assignors to International Minerals & Chemical Corporation, Chicago, Ill., a corporation of New York Application April 25, 1945, Serial No. 590,270

3 Claims. (Cl. 23—91)

The invention relates to the manufacture of magnesium chloride and is of particular value in connection with the production of magnesium chloride from materials containing large amounts of calcium as well as magnesium, for example dolomite rock.

A prior method for producing magnesium chloride from dolomite has been disclosed in the Lundin United States Letters Patent 2,394,863 dated February 12, 1946. In the Lundin process, the dolomite is calcined and slaked to produce a mixture of insoluble hydroxides of calcium and magnesium, which mixture in the form of an aqueous suspension is acted upon by $CO_2$ so as to convert substantially all of the calcium hydroxide to calcium carbonate, the magnesium hydroxide being substantially unaffected.

After such selective carbonation of the calcium hydroxide, a suspension of these insolubles is vigorously stirred at the same time that hydrochloric acid is sprayed into the suspension, the agitation being sufficiently vigorous and the hydrochloric acid being introduced in such finely divided form that the hydrochloric acid selectively reacts with the magnesium hydroxide rather than with the calcium carbonate in the suspension. As a result, Lundin produces a solution of magnesium chloride, which is substantially free from dissolved calcium, the calcium carbonate having been virtually unattacked by the acid. Lundin then separates the insolubles by filtration so as to obtain a fairly pure solution of magnesium chloride.

The process as above described has been practiced with some success. However, in commercially producing large volumes of magnesium chloride as a feed for electrolytic cells used in the production of magnesium metal, it has been found desirable, in order to obtain the necessary efficiency from the electrolytic cells available, to obtain a purer solution of magnesium chloride than can be obtained with the Lundin process exactly as described in his application.

In practicing the Lundin process, it has been found that, under certain conditions, it is difficult to effect proper distribution of the acid through the batch. When such high concentration of acid occurs at any point in the batch, most of the magnesium hydroxide is first selectively decomposed and, after that, the remaining unreacted hydrochloric acid will attack the calcium carbonate to put the calcium into solution, and this calcium in the final product appears as calcium chloride, which has a bad effect in the electrolytic cells, reducing the efficiency of the equipment and causing other troubles.

The production of this calcium chloride impurity in the final desired magnesium chloride solution can be to a certain extent minimized by reducing the amount of acid, so as to insure, so far as possible, that there will always be sufficient unreacted magnesium hydroxide in the batch, thereby protecting or insulating the calcium carbonate against undue localized concentration of acid. However, this involves the discarding of valuable magnesium in the cake produced in separating the insolubles from the magnesium chloride solution, and therefore decreases the amount of magnesium chloride which is recovered, and at the same time increases the expense of the recovery.

For the above reasons, it has not been found possible to increase the capacity of the Lundin process beyond the point where the disadvantages of excess calcium impurity or the cost of efficiency of production become too serious.

The purpose of the present invention is to enable a process of the general character disclosed in the Lundin application to be carried on economically and efficiently at a high rate of output, while producing magnesium chloride of a high degree of purity and with a minimum percentage content of undesirable calcium. A further object is to produce calcium carbonate of great purity as a by-product of substantial value.

General method

In general, it can be said that the invention utilizes those principles of the Lundin process which involve the production of a suspension of calcium carbonate and magnesium hydroxide, followed by an acidulation step in which the magnesium hydroxide is selectively reacted by hydrochloric acid. However, with our process the acidulation step is carried to a point where the solution contains not only magnesium chloride but also a considerable percentage of calcium.

Our invention serves to effect a substantially complete elimination of the soluble calcium contained in the solution resulting from the acidulation step. Such elimination is effected preferably by re-cycling the solution back to the system at a point between the first carbonation step and the later acidulation step and by acting upon said solution at that point in order to eliminate the calcium.

Such elimination of calcium is preferably effected by contacting the unrefined solution with $CO_2$ in the presence of magnesium hydroxide. The result is that the calcium in solution is selectively precipitated as calcium carbonate, and magnesium hydroxide is changed to magnesium chloride which goes into solution. It is believed that the reaction between the calcium ions in the solution and the magnesium hydroxide is not direct, but is a two-step reaction, and that the $CO_2$ first reacts with the magnesium hydroxide to produce magnesium carbonate, and then the calcium ions are able to interchange with the magnesium ions to form insoluble calcium carbonate, the magnesium going into solution as magnesium chloride. This is illustrated by the reaction

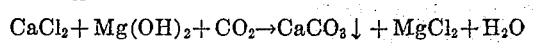

$CaCl_2 + Mg(OH)_2 + CO_2 \rightarrow CaCO_3 \downarrow + MgCl_2 + H_2O$

*Specific example*

In order to illustrate the above general principles, and certain specific details which we have found it desirable to employ in actual practice, we have prepared a drawing showing a diagram or flow sheet of a selected embodiment of the invention as used in preparing a calcium-free magnesium chloride solution from dolomite.

Dolomite rock, which is considered to be a double carbonate of calcium and magnesium, is calcined at a sufficiently high temperature, for example between 1600° and 1800° F., for a sufficient length of time, for example from 1 to 4 hours, to drive off substantially all of the $CO_2$ and convert the material into the oxides of calcium and magnesium. The dolomite need not be crushed except to the extent necessary to enable it to travel properly through the calcining furnace. Preferably, the calcining is effected in a tubular, slightly inclined, rotary kiln similar to that which is employed in the cement industry.

The calcined material, after being cooled to below 100° C., is then slaked with water at a temperature of about 90° C., sufficient cold water being subsequently added to the batch to produce a relatively cool and fluid suspension of the hydroxides of calcium and magnesium containing from 75 to 150 grams of calcium and magnesium per liter calculated as the oxides. It will be understood that the hydroxide of magnesium is practically insoluble and calicum hydroxide is relatively insoluble, in water, a saturated solution of the latter containing per liter not more than about 2 grams calculated as oxide. Hence, as a practical matter, the percentage of these materials which can be dissolved in the liquid is so extremely small compared with the amount in suspension that these hydroxides may be considered as insoluble, while recognizing, of course, that some degree of solubility perhaps may be essential to a proper reactivity. Similarly, the water of the suspension both before and after the carbonation step contains such a relatively insignificant amount of dissolved material that, for the purposes of this step of the process, it may be considered to be pure water.

Before proceeding further with the process, it may be advisable to employ any convenient type of mechanical or hydraulic classifier for the purpose of removing from the milk or suspension whatever coarse particles may be present in the form of silica originally present in the rock, unslaked dolomite, or other like coarse impurities.

*The first carbonation step*

Selective carbonation of the calcium hydroxide in suspension or in solution (calcium hydroxide is, as is well known, slightly soluble in water) is effected by thoroughly mixing and agitating the batch while introducing $CO_2$. This is supplied in the form of flue gases escaping from the continuous rotary kiln which is employed in the calcining step. These flue gases contain from 20 to 30% of carbon dioxide. Preferably it is advisable to conduct the carbonation step continuously in two or more, preferably three or four stages, the final stage receiving a sufficient supply of carbon dioxide so that, in the absence of other precautions, there would be a slight excess of carbon dioxide which would thus react with some of the magnesium hydroxide to form magnesium carbonate. Therefore, in order to produce a suspension in which the calcium is almost completely in the form of carbonate and the magnesium in the form of the hydroxide, a small supply of raw slurry, i. e. the uncarbonated calcium and magnesium hydroxide suspension, is fed into the last stage of the process. The volume of this small stream or trickle of raw slurry can be conveniently adjusted to the correct amount, so that the final selectively carbonated suspension will be free from calcium hydroxide and will not contain any significant amount of magnesium carbonate. This condition is shown by a sharp drop in the pH and the electrical conductivity of the suspension at the final outflow point.

Although, in certain cases, it may be possible to react the selectively carbonated suspension without any intermediate treatment steps, it is advantageous to filter or centrifuge the suspension so as to permit removal of some of the water. This water is used for slaking the calcined rock and is thus re-cycled continuously.

The cake resulting from the removal of water in the preceding stage consists of calcium carbonate and magnesium hydroxide and contains substantially all of the calcium and magnesium contained in the original dolomite rock. These solid materials are then re-pulped with a solution which has been re-cycled back to the system from a subsequent stage in the process. Said solution contains a relatively large percentage of magnesium chloride and an appreciable percentage of calcium chloride. In a specific case, the magnesium chloride was present to the extent of 183 grams per liter, and the calcium ion was present to the extent of 16 grams per liter, which is equivalent to approximately 45 grams of calcium chloride per liter.

The combined mixture, after re-pulping, in a specific example, contained 54 grams of magnesium hydroxide per liter, 100 grams of calcium carbonate per liter, 160 grams of magnesium chloride per liter, and 14 grams of the calcium ion per liter.

The purpose of the next stage of the process is to get rid of the dissolved calcium so as to produce a substantially calcium-free solution of magnesium chloride. To this end, the suspension is reacted with $CO_2$ in a second carbonating tower or tank for a sufficient length of time so as to use up substantially all of the dissolved calcium and a part of the magnesium hydroxide thereby forming additional amounts of calcium carbonate and magnesium chloride.

Whereas, in the first carbonating stage, the $CO_2$ may be under relatively low pressure, for example such as would be produced by a Sturtevant type blower, in the second stage in order to reduce the time for carbonation it is advisable to employ a geared type of pump so as to deliver the $CO_2$ to the No. 2 carbonator under a pressure of several pounds per square inch.

After the second stage of carbonating has been completed, the batch is found to contain in the specific instance selected, 36 grams of magnesium hydroxide per liter, 131 grams of calcium carbonate per liter, 183 grams of magnesium chloride per liter, and only about 0.5 gram of calcium ion per liter.

The batch is then discharged into a thickener (No. 1). The overflow from this thickener goes to a filter in order to remove any solid particles which have not been eliminated from the solution by settling in the thickener. The filtrate from said filter contains approximately 185 grams of magnesium chloride per liter, and the calcium is found to be only about one-half of one percent per liter or less. This magnesium chloride solution may then be dried according to the usual methods and employed as a feed for electrolytic cells or for any other desired purpose.

The cake from said filter contains some adherent solution, and therefore it is preferable to salvage it by adding it to the underflow of thickener No. 1.

The under-flow from the previously described thickener (No. 1), which contains as solids calcium carbonate and magnesium hydroxide with a considerable amount of magnesium chloride solution, is conducted into the acid reactors where it is treated with 20% hydrochloric acid in the same manner as is done in connection with the Lundin process, i. e. the batch is continuously and vigorously agitated during the time when the hydrochloric acid is being introduced, and preferably at the point where the hydrochloric acid is being introduced. Also, the hydrochloric acid, instead of being introduced in a solid stream, is introduced in a myriad of fine sprays, so that, so far as possible, the hydrochloric acid will always find some magnesium hydroxide with which to react.

Sufficient hydrochloric acid is introduced to neutralize all the magnesium hydroxide which would have entered the reactors if no secondary carbonation had been effected—in other words, sufficient hydrochloric acid is introduced to neutralize all the magnesium hydroxide actually present in the slurry feed to the reactors plus that which was dissolved in the secondary carbonation. This, in effect, means that excess acid is added to the reactors insuring maximum dissolution of the magnesium hydroxide to form magnesium chloride thus obtaining maximum recovery and efficiency.

In practice, the acidulating operation is conducted in such manner that the batch discharged from the reactors contains about 2 grams of magnesium hydroxide per liter, 105 grams of calcium carbonate per liter, 183 grams of magnesium chloride per liter, and 16 grams of calcium ions per liter.

The mixture is then charged into a thickener (No. 2). The overflow from this No. 2 thickener is recycled and used in the previous step of the process for the purpose of re-pulping the solids (consisting of calcium carbonate and magnesium hydroxide) coming from the centrifuge and produced in the initial selective carbonation step.

The underflow from the No. 2 thickener contains a good deal of the valuable solution flowing out of the reactors, and is conducted to a filter, and the filtrate is added to the overflow from the No. 2 thickener. The cake from the filter contains 96% of calcium carbonate, and is a valuable by-product which will produce calcium oxide of over 95% purity.

It will be understood by those skilled in the art that, in the case of the final filtering operation which has been described, it is advisable to wash the cake before discarding the latter in order to save adherent solution.

We claim:

1. An improved process for obtaining a substantially calcium-free solution of magnesium chloride, which comprises making a mixture of solid magnesium hydroxide and solid calcium carbonate in an aqueous solution of a major percentage of magnesium chloride and a minor percentage of undesired calcium chloride, reacting said mixture with $CO_2$ for a sufficient length of time, so that substantially all of the calcium chloride and part of the magnesium hydroxide will be converted into undissolved solid calcium carbonate and dissolved magnesium chloride, then separating the solids from the desired calcium-free solution of magnesium chloride, then selectively reacting the solids with hydrochloric acid so as to convert substantially all of the remaining magnesium hydroxide into magnesium chloride and a minor percentage of the calcium carbonate into calcium chloride and thereby produce a solution of said chlorides while leaving most of the calcium carbonate in the solid undissolved form, then separating the said chlorides solution from the solids so as to produce a relatively pure calcium carbonate, and using the said chlorides solution to form the starting mixture for a subsequent batch.

2. An improved cyclic process for obtaining a substantially pure solution of magnesium chloride from an aqueous suspension of a mixture of calcium and magnesium hydroxides, which comprises (a) contacting the suspension of hydroxides with $CO_2$ for a sufficient length of time to convert substantially all of the calcium hydroxide to calcium carbonate while leaving the magnesium hydroxide substantially unchanged, (b) suspending the solids of step (a) in the solution of step (g), (c) contacting the suspension of step (b) with $CO_2$ for only a sufficient length of time to convert substantially all of the calcium chloride to calcium carbonate and form an additional amount of magnesium chloride, (d) separating the substantially pure solution of magnesium chloride formed in step (c) from the calcium carbonate and magnesium hydroxide solids, (e) selectively treating the solids of step (d) with hydrochloric acid to convert substantially all of the magnesium to magnesium chloride and a minor amount of the calcium to calcium chloride, (f) separating the solution formed in step (e) from the calcium carbonate, and (g) recycling the solution of step (f) for use in step (b).

3. An improved cyclic process for obtaining a substantially pure solution of magnesium chloride from an aqueous suspension of a mixture of substantially insoluble calcium and magnesium hydroxides, which comprises (a) contacting the suspension of hydroxides with $CO_2$ for a sufficient length of time to convert substantially all of the calcium hydroxide to calcium carbonate while leaving the magnesium hydroxide substantially unchanged, (b) separating the calcium carbonate-magnesium hydroxide solids of step (a) from the water of the suspension, (c) suspending the solids of step (b) in the solution of magnesium and calcium chlorides of step (h), (d) contacting the suspension of step (c) with $CO_2$ for only a sufficient length of time to convert substantially all of the calcium chloride to calcium carbonate and form an additional amount of magnesium chloride, (e) separating the substantially pure solution of magnesium chloride formed in step (d) from the calcium carbonate and magnesium hydroxide, (f) selectively treating the calcium carbonate-magnesium hydroxide of step (e) with hydrochloric acid to convert substantially all of the magnesium to magnesium chloride and a minor amount of the calcium to calcium chloride, (g) separating the solution of magnesium and calcium chlorides formed in step (f) from the calcium carbonate, and (h) re-cycling the chloride solution of step (g) for use in step (c).

EDGAR E. WREGE.
WILLIAM A. CUNNINGHAM.

REFERENCES CITED

The following references are of record in the file of this patent:

UNITED STATES PATENTS

| Number | Name | Date |
|---|---|---|
| 1,978,403 | Barstow et al. | Oct. 30, 1934 |
| 2,013,334 | Barstow et al. | Sept. 3, 1935 |
| 2,394,863 | Lundin | Feb. 12, 1946 |